(12) United States Patent
Kasperek et al.

(10) Patent No.: US 11,262,230 B2
(45) Date of Patent: Mar. 1, 2022

(54) APPARATUS FOR CONTINUOUS GRAVIMETRIC METERING OF POURABLE MATERIAL

(71) Applicant: FLSmidth A/S, Valby (DK)

(72) Inventors: Daniel Kasperek, Mering (DE); Armin Hauser, Schwabmünchen (DE)

(73) Assignee: FLSmidth A/S

( * ) Notice: Subject to any disclaimer, the term of this patent is extended or adjusted under 35 U.S.C. 154(b) by 0 days.

(21) Appl. No.: 17/254,192

(22) PCT Filed: Jun. 18, 2019

(86) PCT No.: PCT/IB2019/055120
§ 371 (c)(1),
(2) Date: Dec. 18, 2020

(87) PCT Pub. No.: WO2019/244046
PCT Pub. Date: Dec. 26, 2019

(65) Prior Publication Data
US 2021/0123791 A1 Apr. 29, 2021

(30) Foreign Application Priority Data

Jun. 18, 2018 (DK) .......................... PA 2018 70414

(51) Int. Cl.
*B65G 53/40* (2006.01)
*G01G 13/02* (2006.01)
(Continued)

(52) U.S. Cl.
CPC ....... *G01G 13/026* (2013.01); *B65G 53/4616* (2013.01); *G01F 11/24* (2013.01); *G01G 11/083* (2013.01)

(58) Field of Classification Search
CPC .... B05B 14/43; B05B 14/435; G01G 13/026; G01G 11/08; G01G 11/083; G01G 13/10;
(Continued)

(56) References Cited

U.S. PATENT DOCUMENTS 3,178,235 A * 4/1965 Zimmermann .... B65G 53/4616
406/63
3,909,068 A 9/1975 Coucher
(Continued)

OTHER PUBLICATIONS

The International Search Report and Written Opinion dated Dec. 5, 2019, 9 pages.

*Primary Examiner* — Charles P. Cheyney
(74) *Attorney, Agent, or Firm* — Jeffrey A. Sharp (57) ABSTRACT

An apparatus (1) for continuous gravimetric metering of pourable material comprises a housing (2) comprising a first and a second spaced wall (5,6), a charging port (7) through the first wall (5), and a discharging port (8) through the first wall (5) displaced from the charging port (7) and a primary air port (10) with a primary outlet opening (9) through the second wall (6) opposite to the discharging port (8). In the second wall (6) a secondary air port (12) is provided with a secondary outlet opening (11) having a substantially smaller outlet area than the primary outlet opening (9) and being displaced from the primary outlet opening in opposite direction to the rotational direction of the rotor (3) and being arranged opposite to the discharging port (8), and where the primary and secondary air ports (10,12) are connected to a compressed air supply.

15 Claims, 6 Drawing Sheets

(51) Int. Cl.
*B65G 53/46* (2006.01)
*G01F 11/24* (2006.01)
*G01G 11/08* (2006.01)

(58) Field of Classification Search
CPC .. G01G 13/028; B65G 53/4616; B65G 53/32; B65G 53/525
USPC ............... 406/63, 66, 67; 222/370, 636, 77
See application file for complete search history.

(56) References Cited

U.S. PATENT DOCUMENTS

| | | | | |
|---|---|---|---|---|
| 4,376,600 | A * | 3/1983 | Egli | B65G 53/4616 406/63 |
| 4,646,943 | A | 3/1987 | Haefner | |
| 4,661,024 | A | 4/1987 | Haefner | |
| 5,094,403 | A * | 3/1992 | Tschumi | B65G 53/32 222/370 |
| 5,184,892 | A * | 2/1993 | Hafner | G01G 11/08 366/10 |
| 7,226,248 | B2 * | 6/2007 | Hafner | B65G 53/4616 222/636 |
| 8,221,035 | B2 * | 7/2012 | Wolfschaffner | G01G 11/083 406/31 |

* cited by examiner

APPARATUS FOR CONTINUOUS GRAVIMETRIC METERING OF POURABLE MATERIAL

FIELD OF THE INVENTION

The present invention relates to an apparatus for continuous gravimetric metering of pourable material, such as a fuel material, preferably comprising coal, comprising:
- a housing comprising a first and a second mutually spaced wall, a charging port through said first wall, a discharging port through one of said walls displaced from said charging port and at essentially same radius as said charging port with respect to a predetermined vertical axis, a primary air port through the other wall opposite to said discharging port, said primary air port having a primary outlet opening and being connected to a compressed air supply;
- a rotor mounted in and sealed to said housing for rotation about said predetermined vertical axis including a plurality of pockets extending therethrough at spaced locations separated by a rotor partition wall having a thickness t, said pockets having a pocket opening front edge as seen in the rotational direction of the rotor and said pockets forming a first ring of pockets along the same radius as said charging and discharging ports, a circular measuring path being defined between the charging port and the discharging port, the pockets receiving material via the charging port and material being emitted through said discharging port during the rotation of the rotor;
- drive means configured for rotating said rotor in a rotational direction;
- speed indication and control means configured for controlling the rotational speed of said rotor;
- load-measuring means configured for measuring the weight of the material traveling along the measuring path.

BACKGROUND OF THE INVENTION

U.S. Pat. No. 4,528,848 discloses an apparatus of the above type. Through the charging port material is charged to the pockets of rotating rotor. The rotation of the rotor moves material along the measuring path from a position opposite the charging port to a position opposite the discharging port. At the discharging port the material is discharged through the discharging port by means of compressed air ejected through the primary outlet opening of the primary outlet port arranged opposite the discharging port. The rotational speed of the rotor varies based on the desired amount of feed material to be discharged through the discharging port and delivered to a burner per time unit (feed rate). For low feed rates the rotational speed of the rotor will be low. The fast extraction of the material from the pockets by means of the compressed air results for low feed rates in a situation, where one pocket is emptied before the next pocket has moved into the primary outlet opening of the primary air port as seen in a horizontal projection. This causes pulsations of the flow of material out through the discharging outlet port and accordingly pulsations in the feed of material to the burner (alternating phases of air with material and solely air).

SUMMARY OF THE INVENTION

The object of the present invention is to solve and/or at least remedy the above problem and provide a less fluctuating or more uniform flow of material out through the discharging port for low feed rates.

The above object is obtained by an apparatus of the above stated type being characterized in that the other wall of the housing comprises a secondary air port having one or more secondary outlet openings including a first secondary outlet opening and being connected to a compressed air supply, the secondary outlet opening(s) of the secondary air port having an secondary outlet opening front edge and a total outlet area being substantially smaller than that of the primary outlet opening and being displaced from the primary outlet opening of the primary air port in opposite direction to the rotational direction of the rotor and being arranged opposite to said discharging port.

The compressed air supply which is connected to the secondary outlet opening can be the same compressed air supply as the compressed air supply which is connected to the primary outlet opening. Alternatively, the primary and the secondary outlet openings can be connected to different compressed air supplies.

By the phrase "a secondary air port having one or more secondary outlet openings including a first secondary outlet opening" is to be understood that the first secondary outlet opening of the secondary air port can comprise a single outlet opening. However, the first secondary outlet opening can also comprise a number of secondary outlet openings. The number of secondary outlet openings can be arranged on the same radial line, i.e. on the same angle of rotation in front of the primary outlet opening of the primary air port, or on different angles of rotation in front of the primary outlet opening. In the latter case the secondary outlet openings can be arranged on essentially the same radius with respect to the predetermined vertical axis.

By means of the present invention it is obtained that a portion of the amount of the material in a pocket is discharged by a relatively small amount of compressed air emitted through the first secondary outlet opening when the pocket passes the first secondary outlet opening and the remainder material in said pocket discharged by a larger amount of compressed air emitted through the primary outlet opening when the pocket passes the primary opening. The relatively small amount of compressed air emitted through the first secondary outlet opening is selected to cause pneumatic material extraction from the pocket, but is on the other hand so low that the extraction occurs slowly. The larger amount of compressed air emitted through the primary outlet opening is selected to ensure that the remainder material in the pocket is extracted from the pocket, i.e. all material is removed from the pocket. As a result, material is at least essentially constantly extracted through the discharging port and the pulsation and the flow of material out through the discharging port at least reduced.

According to the invention the total outlet area of the secondary outlet opening(s) can be 0.1% to 25%, such as 0.1% to 20%, 0.5% to 15%, 1% to 15%, 1% to 10% 1.5% to 10%, 1.5% to 7%, 2% to 7% or 3% to 5% of the outlet area of the primary outlet opening.

The radial length of the secondary outlet opening can be less than 30% of the radial length of the primary outlet opening, such as less than 25%, 20%, 15%, 10%, 5%, 2.5% of the radial length of the primary outlet opening According to the invention the front edge of the secondary outlet opening can be displaced at least a rotational angle $X_{min}$ of the rotor from the primary outlet opening, $X_{min}$ being defined as ¼ or ⅓×(360°/number of pockets in a pocket ring)

Additionally, according to the invention the secondary outlet opening can be displaced less than an angle of rotation $X_{max}$ of the rotor from the primary outlet opening, $X_{max}$ being defined as 5×(360°/number of pockets in a pocket ring).

Thereby, when the secondary outlet opening is displaced an angle of rotation corresponding to at least (360°/number of pockets in a pocket ring), material is first ejected from a given pocket by air emitted thereto through the secondary outlet opening and at least an angle of rotation of least (360°/number of pockets in a pocket ring). Later, the remainder material in the given pocket will be ejected from that pocket by air emitted through the primary outlet opening. However, by means of air emitted through the primary outlet opening material will be ejected from a pocket arranged in front of the given pocket during the rotation of the rotor corresponding to at least (360°/number of pockets in a pocket ring), whereby material is at least essentially constantly extracted through the discharging outlet port and/or pulsations of the flow of material out through the discharging port are reduced.

The rotor may also have more than two, such as three, four or five, co-axially arranged rings of pockets.

According to the invention, the displacement of the secondary outlet opening in respect to the primary outlet opening and the thickness t of the rotor partition walls is dimensioned so that when the secondary outlet opening is completely covered by a partition wall, the pocket opening front edge of a pocket opening is within the primary outlet opening as seen in a vertical projection.

It is thereby obtained that material is essentially constantly extracted and/or pulsations of the flow of material out through the discharging port are reduced.

Further, according to the invention the first secondary outlet opening of the secondary air port can be oblong and extend towards the primary outlet opening.

In principle the secondary outlet opening could extend up to and into the primary outlet opening at a connection point to form a connection between the first secondary outlet opening of the secondary air port and the primary outlet opening of the primary air port.

However, at the connection point the connection between the secondary and primary outlet openings should be so narrow that essentially no compressed air is emitted therethrough and the said openings essentially separated in respect to the emission of air.

Additionally, according to the invention the primary air port and the secondary air port can be configured as a single air port being provided with two separate and mutually spaced outlet openings in the form of the primary outlet opening and the first secondary outlet opening.

Further, according to the invention the primary air port and the secondary air port can be separate air ports, such as air ports formed by separate tubes or hoses, the air ports being optionally separated by a common port partition wall.

The connection line between the primary and secondary air port, respectively, and the compressed air supply can be configured for and/or provided with means configured for providing a predetermined flow of and pressure of compressed air emitted through the primary and the secondary outlet openings.

The means configured for providing a predetermined flow and pressure of compressed air emitted through the primary and the secondary outlet openings can comprise adjustable valve means.

According to the invention the first wall can be an upper wall and the second wall can be a lower wall.

Further, according to the invention the discharging port can be provided in the first wall, i.e. the upper wall.

However, the discharging port can also be provided in the second wall, i.e. the lower wall.

The pockets can essentially have the shape of a sector of an annulus and be separated by radially extending pocket partition walls.

Further, the apparatus can comprise a second ring of pockets being arranged co-axially with the rotor axis and inwardly of the first ring of rotor pockets.

The second ring of pockets can have essentially the shape of a sector of an annulus and being mutually separated by pocket partition walls, preferably being radially extending partitioning walls and preferably being circumferentially spaced apart from the rotor pockets of the first rotor by for instance approximately ½×(360°/number of pockets in the ring of pockets), whereby a partition wall of the second ring of pockets is arranged essentially midway between two partition walls of a pocket of the first ring of pockets.

The drive means for the rotor can be an infinitely variable drive motor.

Sealing elements means can advantageously be provided between the first and second walls, respectively, and the rotor, especially between the rotor and the housing in the area of the discharging port.

BRIEF DESCRIPTION OF THE FIGURES

An embodiment of the invention will be described in more detail in the following with regard to the accompanying figures. The figures show one way of implementing the present invention and are not to be construed as being limiting to other possible embodiments falling within the scope of the attached claim set.

DETAILED DESCRIPTION OF AN EMBODIMENT

The apparatus 1 according to the invention for continuous gravimetric metering of pourable material illustrated in FIG. 1 to 6 comprises a housing 2 in which a rotor 3 having a axle of rotation 4 defining an axis of rotation A is arranged. The housing 2 comprises a first wall 5 being an upper wall and a second wall 6 being a lower wall axially spaced from the first/upper wall 5. The housing additionally comprises a charging port 7 through which material is charged to the housing 2 and a discharging port 8 through which material is discharged from the housing 2. The charging port 7 and the discharging port 8 are arranged mutually spaced apart and at the same radius in respect to the vertical axis of rotation A.

The rotor 3 comprises a number of rotor pockets 13 extending therethrough at spaced locations separated by a rotor partition wall 14 having a thickness t. The rotor pockets 13 form a first ring 32 of pockets on essentially the same radius in respect to the axis of rotation as the charging port 7 of the housing and the discharging port 8 of the housing. The pockets receive material via the charging port 8 and material is emitted through the discharging port. Each pocket has a pocket opening 37 and a pocket opening front edge 38.

Figure 5:
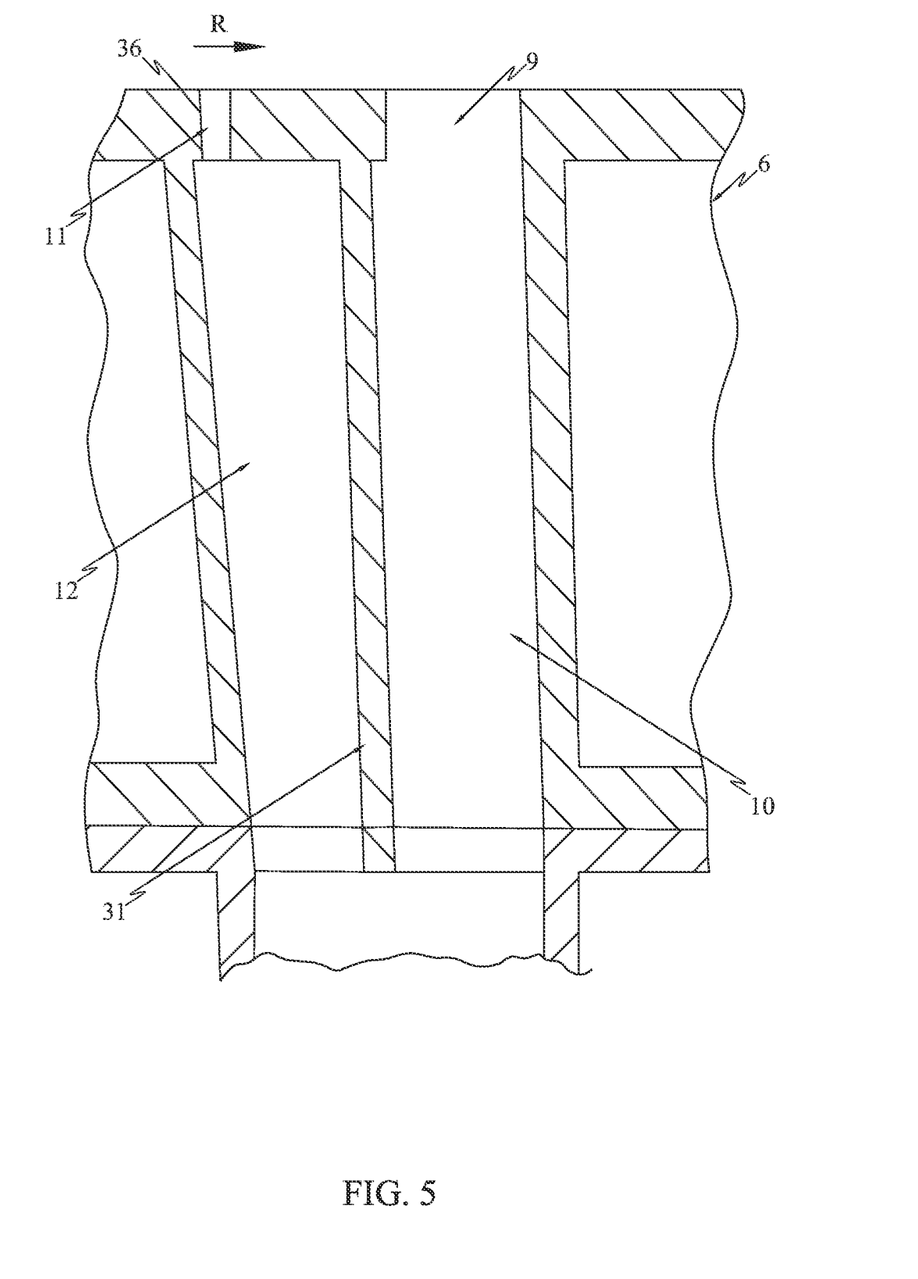
FIG. 5 is an enlarged sectional view along the line V-V in FIG. 4.
Figure 6:
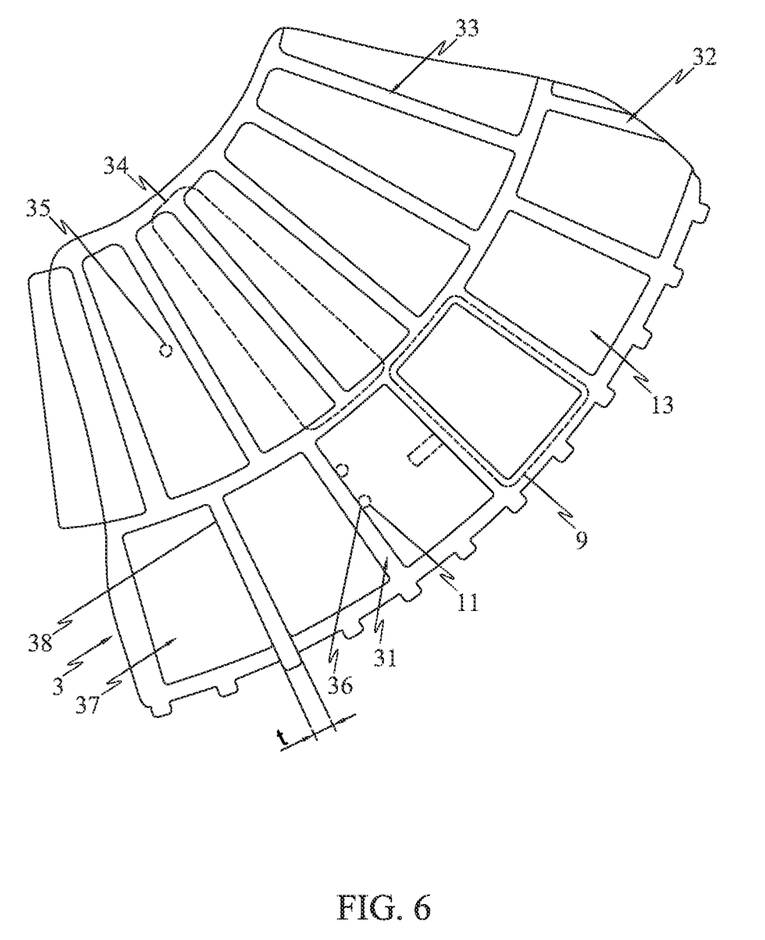
FIG. 6 is an enlarged plan view of the area with the outlet openings of the upper face of the bottom wall shown in FIG. 4, the outlet opening being shown by dotted lines and the rotor pockets of the rotor arranged above the bottom wall of the apparatus are shown by full lines.

A primary outlet opening 9 of a primary air port 10 extends through the second/lower wall 6 and a first secondary outlet opening 11 of a secondary air port 12 extends through the second/lower wall 6 opposite to and in line with the discharging port 8. The first secondary outlet opening 11 of the secondary air port 12 has a second outlet opening front edge 36 and a total outlet area considerably smaller than that of the primary outlet opening and is displaced from the primary outlet opening in opposite direction to the rotational direction R of the rotor 3. In other words, the first secondary outlet opening is arranged in front of the primary outlet opening as seen in the rotational direction R of the rotor 3, see FIG. 4, 5 or 6. The first secondary outlet opening can have any shape, for example circular or oblong as shown in FIG. 6. In the examples shown the outlet area of the first secondary outlet opening is 2% to 6% of the outlet area of the primary outlet opening.

The first secondary outlet opening 11 of the secondary air port 12 is displaced a distance from the primary outlet opening 9 of the primary air port 10 in the present example being about at least ⅓×(360/number of pockets in a ring of pockets), in the present case the number of pockets in the first pocket ring 32 being 36 pockets.

Figure 1:
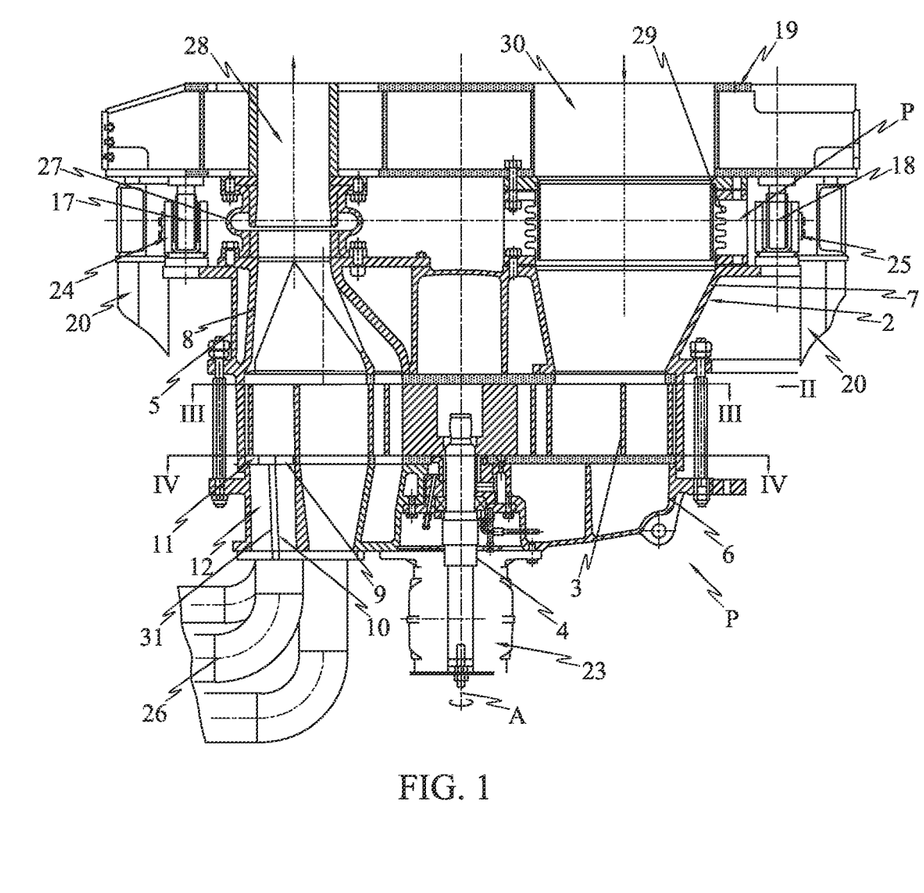
FIG. 1 is an axially sectional view of an apparatus according to the invention.

The primary air port 10 and the secondary air port 12 are connected to a supply of compressed air configured to supply compressed air to the primary and secondary air port 10,12 through a supply line 26. The secondary air port 12 is separated from the primary air port 10 by a partition wall 31, as shown in FIGS. 1 and 5. The solution of separating the primary and secondary air ports by means of a partition wall 31 can be used for providing an apparatus according to the present invention by retrofitting a partition wall to the air port of a known apparatus. The compressed air supplied to the primary air port 10 is emitted through the primary outlet opening 9 and the compressed air supplied to the secondary air port 12 is emitted through the first secondary outlet opening 11.

The rotor 3 of the apparatus is arranged in the housing between the first/upper wall 5 and the second/lower wall 6. As mentioned, the rotor 3 comprises a plurality of rotor pockets 13 extending through the rotor at spaced locations along the same radius as the charging port 7 and the discharging port 8, thereby forming a first ring 32 of rotor pockets, the rotor pockets 13 being mutually separated by rotor partitions walls 14 having a thickness t. The pockets of the first ring 32 of rotor pockets have essentially the shape of sectors of an annulus and are separated by the essentially radially extending rotor partition walls 14.

FIG. 6 illustrates that during slow rotation of the rotor a rotor pocket 13 first reaches the first secondary outlet opening 11 emitting a relatively small amount of compressed air so that only a portion of the material contained in the pocket is discharged. Subsequently, the pocket reaches the primary outlet opening 9 emitting a relatively large amount of compressed air, whereby the remainder material in the pocket is discharged.

Figure 3:
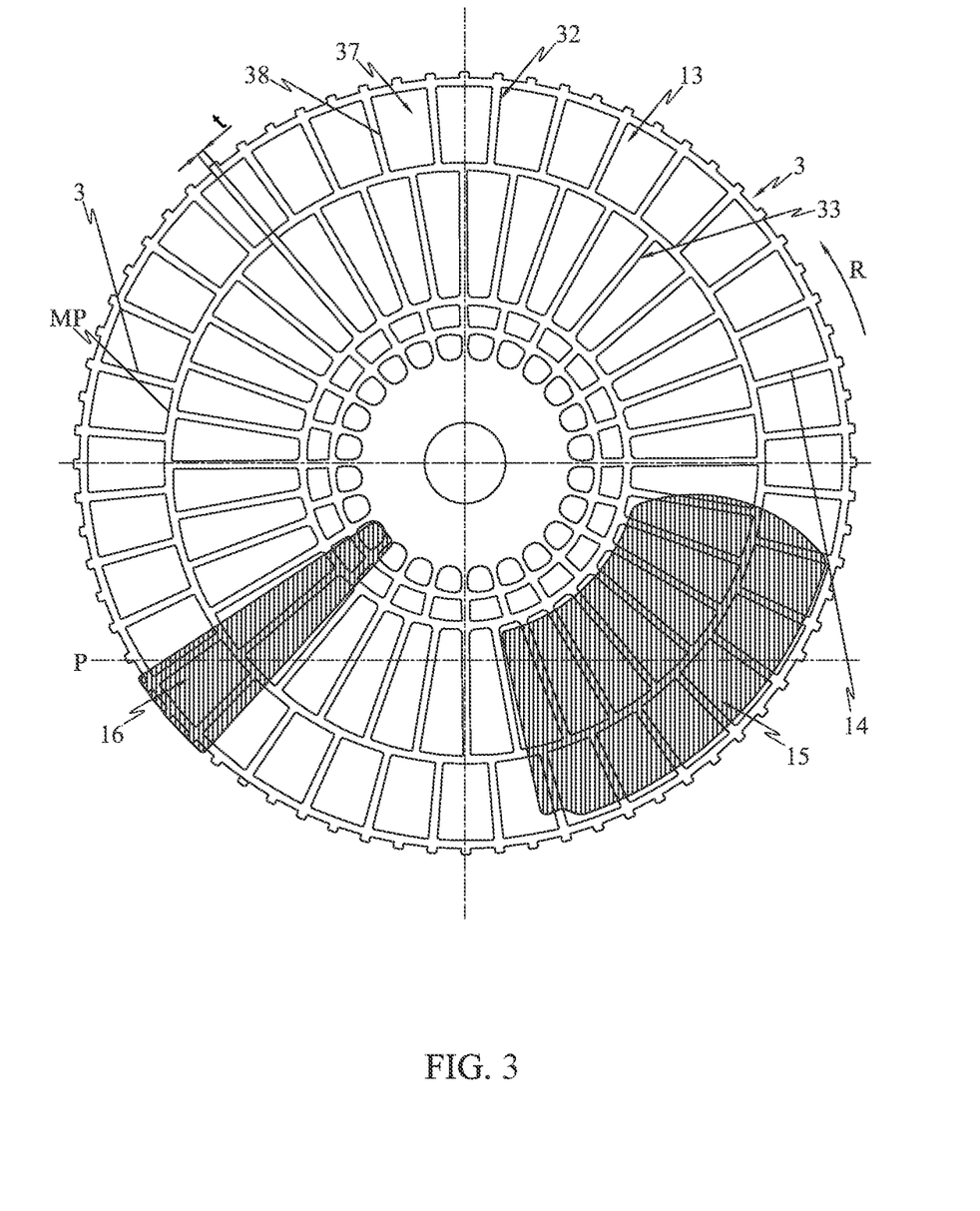
FIG. 3 is a plan view of a rotor of the apparatus in FIG. 1 as seen in the direction III-Ill in FIG. 1 and illustrating a material-charging area and a material-discharging area.
Figure 4:
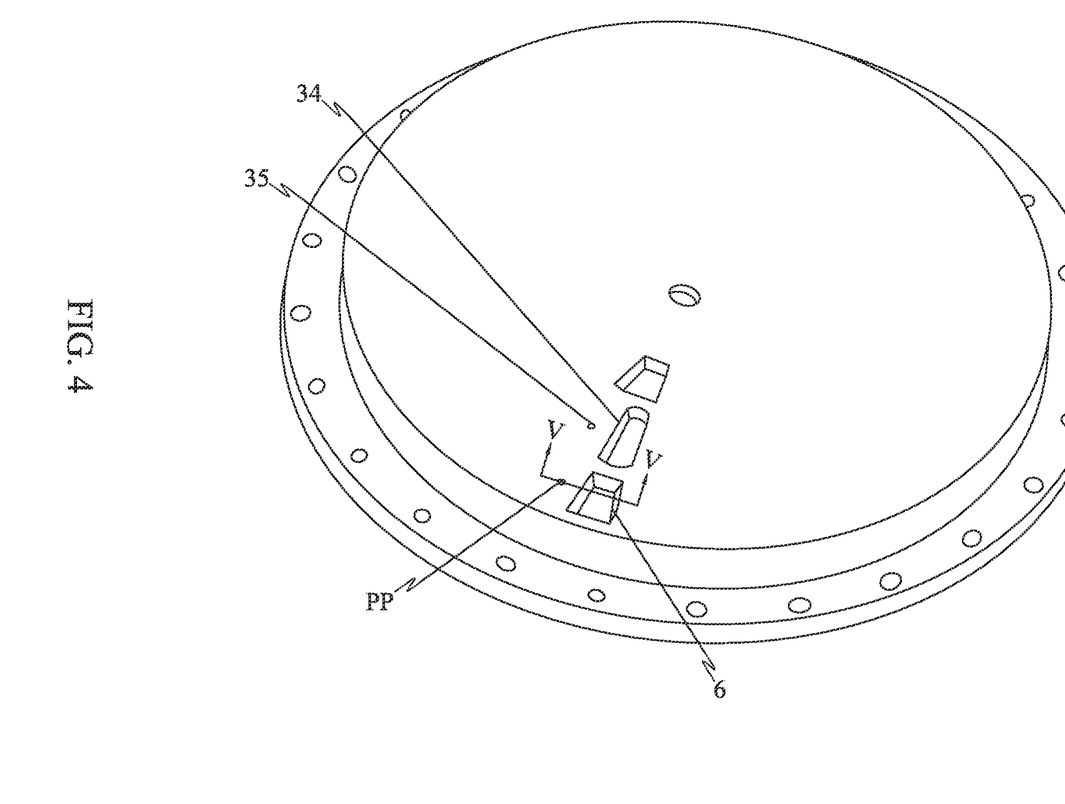
FIG. 4 is a perspective view of the apparatus in an enlarged scale and seen towards the upper face of the bottom wall of the apparatus as indicated by the arrow IV-IV in FIG. 1

FIGS. 3, 4 and 6 disclose that the apparatus comprises a second ring 33 of rotor pockets being arranged co-axially with the rotor axis and inwardly of the first ring 32 of rotor pockets.

The second ring 33 of pockets can have essentially the shape of a sector of an annulus and be mutually separated by pocket partition walls, preferably being radially extending partition walls and being preferably circumferentially spaced apart from the rotor pockets of the first rotor by for instance approximately ½×(360°/number of pockets in the ring of pockets), whereby a partition wall of the second ring of pockets is arranged essentially midway between two partition walls of a pocket of the first ring 33 of pockets. Further, the second/lower wall 6 of the apparatus comprises an additional primary outlet opening 34 and an additional first secondary outlet opening 35 spaced apart from the additional primary outlet opening in the opposite direction of the rotation direction R of the rotor 3, the first secondary outlet opening being considerably smaller than the primary outlet opening.

A circular measuring path is defined between the charging port 7 and the discharging port 8. During rotation of the rotor in the rotational direction R shown in FIG. 3, the rotor pockets 13 receive material through the charging port 7 in a material-receiving area 15 and material is emitted from the pockets 13 and through the oppositely arranged discharging port 8 in a material-discharging area 16.

Figure 2:
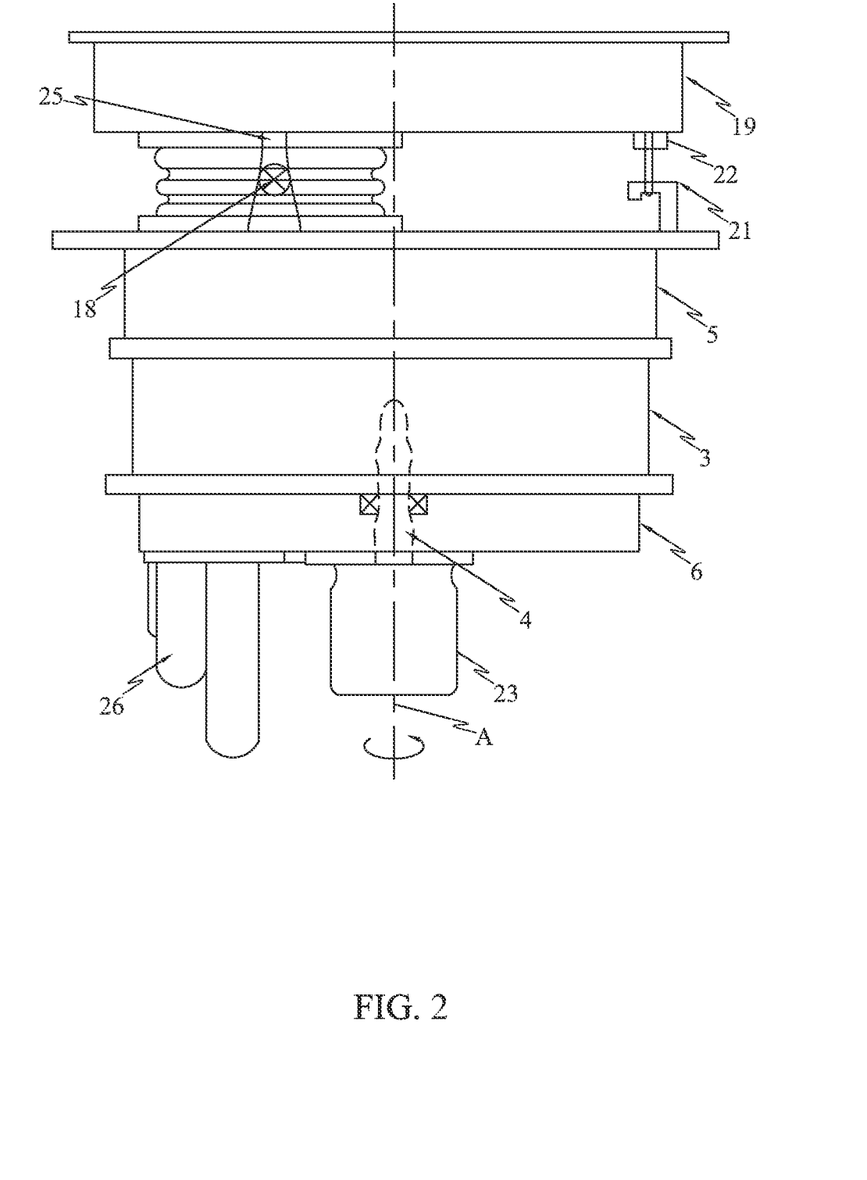
FIG. 2 is a simplified lateral view of the apparatus in FIG. 1 as seen in the direction of the arrow II.

The weight of the material in the rotor pockets 13 between the pocket at the charging port 7 and the pocket at the discharging port 8 generates a load moment around a pivot axis P extending through the center of the charging port 7 and the discharging port 8, as shown in FIGS. 1, 2 and 3, the pivot axis P being defined by two mutually spaced bearings 17, 18 in a first and a second suspension 24,25 by which the housing 2 is suspended in an upper structure 19 carried by legs 20 extending down to the floor. The housing 2 is additionally suspended in the upper structure by a third suspension 21 comprising a load cell 22 as shown in FIG. 2. The load cell 22 is configured for measuring the load of the housing and the material in the rotor pockets 13 between the charging port 7 and the discharging port 8 and thereby also the weight of the material inside the rotor 3 along the measuring path MP. As shown in FIG. 1, first elastic coupling 27 is mounted between the discharging port 8 and an outlet port 28 of the upper structure 19 and a second elastic coupling 29 is mounted between the charging port 7 and an inlet port 30 of the upper structure in order to allow the housing to pivot relative to the upper structure on the pivot axis P The apparatus also comprises a drive motor 23 for driving the axle 4 of rotation of the rotor 3, the drive motor being preferably a infinitely variable drive motor.

The amount of material discharged from the apparatus is controlled by controlling the rotational speed of the rotor by means of the motor 23

LIST OF REFERRAL NUMBERS

1 Apparatus
2 Housing
3 Rotor
4 Axle of rotation
5 First/upper wall
6 Second/lower wall 7 Charging port
8 Discharging port
9 Primary outlet opening
10 Primary air port
11 First secondary outlet opening
12 Secondary air port
13 Rotor pocket
14 Rotor partition wall
15 Material receiving area
16 Material discharging area
17 Bearing
18 Bearing
19 Upper structure
20 Leg
21 Third suspension
22 Load cell
23 Motor
24 First suspension
25 Second suspension
26 Supply line
27 First elastic coupling
28 Outlet port of upper structure
29 Second elastic coupling
30 Inlet port of upper structure
31 Partition wall
32 First ring of pockets
33 Second ring of pockets
34 Additional primary outlet opening
35 Additional first secondary outlet opening
36 Secondary outlet opening front edge
37 Pocket opening
38 Pocket opening front edge
A Axis of rotation
t Thickness of rotor partition walls
MP Measuring path
R Rotation direction
P Pivot axis

The invention claimed is:

1. An apparatus (1) for continuous gravimetric metering of pourable material, comprising:
    a housing (2) comprising a first and a second mutually spaced wall (5, 6), a charging port (7) through said first wall (5), a discharging port (8) through one of said walls displaced from said charging port (7) and at essentially same radius as said charging port (7) with respect to a predetermined vertical axis, a primary air port (10) through the other of said walls (6) and opposite to said discharging port (8), said primary air port (10) having a primary outlet opening (9) and being connected to a compressed air supply;
    a rotor (3) mounted in and sealed to said housing (2) for rotation about said predetermined vertical axis including a plurality of pockets (13) extending therethrough at spaced locations separated by a rotor partition wall (14) having a thickness (t), said pockets (13) having a pocket opening front edge (38) as seen in the rotational direction of the rotor (3) and said pockets (13) forming a first ring (32) of pockets along the same radius as said charging and discharging ports (7, 8), a circular measuring path (MP) being defined between the charging port (7) and the discharging port (8), the pockets (13) receiving material via the charging port (7) and material being emitted through said discharging port (8) during the rotation of the rotor (3);
    a drive motor (23) configured for rotating said rotor (3) in a rotational direction;
    a control unit configured for speed indication and controlling the rotational speed of said rotor (3);
    a load cell (22) configured for measuring the weight of the material travelling along the measuring path (MP); and
    a secondary air port (12) provided in the other of said walls (6), the secondary air port (12) having one or more secondary outlet openings including a first secondary outlet opening (11) and being connected to a compressed air supply, the secondary outlet opening(s) (11) of the secondary air port (12) having a secondary outlet opening front edge (36) and a total outlet area being substantially smaller than that of the primary outlet opening (9);
    wherein the improvement comprises:
    the first secondary outlet opening (11) being displaced from the primary outlet opening (9) of the primary air port (10) in opposite direction to the rotational direction of the rotor (3) and being arranged opposite to said discharging port (8);
    wherein on rotation of the rotor (3), when the pockets (13) pass the first secondary outlet opening (11), a smaller first portion of material in the pockets (13) is discharged into the discharging port (8) by a smaller first amount of compressed air emitted through the first secondary outlet opening (11); and
    wherein on rotation of the rotor (3), when the pockets (13) pass the primary outlet opening (9), a larger second amount of the material in said pockets (13) is discharged into the discharging port (8) by a larger second amount of compressed air emitted through the primary outlet opening (9).

2. The apparatus (1) according to claim 1, wherein the total outlet area of the first secondary outlet opening (11) is 0.1% to 25% of the outlet area of the primary outlet opening (9).

3. The apparatus (1) according to claim 1, wherein the front edge (36) of the first secondary outlet opening (11) is displaced at least a rotational angle $X_{min}$ of the rotor from the primary outlet opening (9), $X_{min}$ being defined as ¼ or ⅓×(360°/number of pockets in a pocket ring).

4. The apparatus (1) according to claim 1, wherein the first secondary outlet opening (11) is displaced less than an angle of rotation $X_{max}$ of the rotor from the primary outlet opening (9), $X_{max}$ being defined as 5×(360°/number of pockets in a pocket ring).

5. The apparatus (1) according to claim 1, wherein the displacement of the first secondary outlet opening (11) in respect to the primary outlet opening (9) and the thickness (t) of the rotor partition walls (14) are dimensioned so that when the first secondary outlet opening (11) is completely covered by one of the partition walls (14), the pocket opening front edge (38) of a pocket opening (37) is within the primary outlet opening (9) as seen in a vertical projection.

6. The apparatus (1) according to claim 1, wherein the first secondary outlet opening (11) of the secondary air port (12) is oblong and extends towards the primary outlet opening (9) of the primary port (10).

7. The apparatus (1) according to claim 1, wherein the primary air port (10) and the secondary air port (12) are configured as a single air port being provided with two separate and mutually spaced outlet openings in the form of the primary outlet opening (9) and the first secondary outlet opening (11).

8. The apparatus (1) according to claim 1, wherein the primary air port (10) and the secondary air port (12) are separate air ports optionally separated by a common port partition wall (31).

9. The apparatus (1) according to claim 1, wherein the first wall (5) is an upper wall and the second wall (6) is a lower wall.

10. The apparatus (1) according to claim 1, wherein the discharging port (8) is provided in the first wall (5).

11. The apparatus according to claim 1, wherein the pourable material comprises a fuel material.

12. The apparatus according to claim 11, wherein the fuel material comprises coal.

13. The apparatus according to claim 2, wherein the total outlet area of the secondary outlet opening (11) is 1% to 10% of the outlet area of the primary outlet opening (9).

14. The apparatus according to claim 13, wherein the total outlet area of the secondary outlet opening (11) is 3% to 5% of the outlet area of the primary outlet opening (9).

15. The apparatus according to claim 8, wherein the primary air port (10) and the secondary air port (12) are separate air ports formed by separate tubes or hoses.

\* \* \* \* \*